United States Patent [19]

Kasai et al.

[11] Patent Number: 4,551,849
[45] Date of Patent: Nov. 5, 1985

[54] VEHICLE PANEL SPEAKER FOR AUTOMOTIVE AUDIO SYSTEM UTILIZING PART OF A VEHICLE PANEL AS A SOUND-PRODUCING MEDIUM

[75] Inventors: Junichi Kasai; Takayuki Yanagishima, both of Yokosuka; Akio Ajimine, Tokyo; Yoshiaki Murakami, Tokyo; Akimitsu Shino, Tokyo; Tatsuya Watanabe, Tokyo, all of Japan

[73] Assignee: Nissan Motor Company, Limited, Tokyo, Japan

[21] Appl. No.: 491,292

[22] Filed: May 3, 1983

[30] Foreign Application Priority Data

| May 11, 1982 | [JP] | Japan | 57-78634 |
| Jun. 1, 1982 | [JP] | Japan | 57-92200 |
| Jul. 12, 1982 | [JP] | Japan | 57-119882 |
| Jul. 13, 1982 | [JP] | Japan | 57-120484 |

[51] Int. Cl.⁴ .............................................. H04R 9/06
[52] U.S. Cl. ................... 381/86; 179/115.5 R; 179/115.5 ES
[58] Field of Search ............ 179/146 E, 115.5 PS, 179/115.5 ES, 115.5 R; 381/86, 90

[56] References Cited

U.S. PATENT DOCUMENTS

| 2,761,913 | 9/1956 | Manley | 179/115.5 H |
| 3,268,672 | 8/1966 | Roesel, Jr. et al. | 179/115.5 R |
| 3,430,007 | 2/1969 | Thielen | 179/181 W |
| 3,449,531 | 1/1969 | Ashworth | 179/181 W |
| 3,567,870 | 3/1971 | Rivera | 179/181 W |
| 3,718,779 | 2/1973 | Schoengold | 179/115.5 |
| 3,861,495 | 1/1975 | Pearson | 181/163 |
| 3,983,337 | 9/1976 | Babb | 179/115.5 VC |
| 3,993,345 | 11/1976 | Croup | 181/150 |
| 4,300,022 | 11/1981 | Hastings-Jones et al. | 179/115.5 DV |
| 4,354,067 | 12/1982 | Yamada | 179/181 W X |
| 4,499,340 | 2/1985 | Kasai et al. | 179/115.5 DV |
| 4,514,599 | 4/1985 | Yanagishima et al. | 381/86 |

FOREIGN PATENT DOCUMENTS

| 56-13896 | 2/1981 | Japan | 179/181 W |
| 56-157199 | 12/1981 | Japan | 179/181 W |
| 2020509 | 11/1979 | United Kingdom |  |
| 2027316A | 2/1980 | United Kingdom |  |

OTHER PUBLICATIONS

Tremaine, Audio Cyclopedia, 1979, p. 1125.

Primary Examiner—James L. Dwyer
Attorney, Agent, or Firm—Lane and Aitken

[57] ABSTRACT

A speaker for the automotive audio system utilizes at least a part of a vehicle panel which constitutes a vehicle body independently of the speaker and adapted for oscillation at an audio frequency. The vehicle panel serving as a sound-producing medium comprises an inner section to be directly driven by a driver unit of the speaker and an outer section connected to the first section via a relatively flexible intermediate section. The relatively flexible intermediate section is adapted to transmit the audio frequency oscillation. The relatively flexible intermediate section serves for amplifying the magnitude of the audio frequency vibration of the vehicle panel and/or for expanding the audio frequency range to be reproduced. Especially, the relatively flexible intermediate section is adapted to improve reproduction of relatively low frequency range of audio sound.

22 Claims, 30 Drawing Figures

VEHICLE PANEL SPEAKER FOR AUTOMOTIVE AUDIO SYSTEM UTILIZING PART OF A VEHICLE PANEL AS A SOUND-PRODUCING MEDIUM

BACKGROUND OF THE INVENTION

The present invention relates generally to a speaker applicable to an automotive audio system capable of producing high-quality audio sound, especially relatively low-frequency sound. More specifically, the invention relates to a vehicle panel speaker which can be driven at high amplitudes without requiring excessively high driving power.

Generally, speakers for automotive audio systems can be installed at various locations in the vehicle compartment. Conventionally, cone-type speakers are used in automotive audio systems to reproduce audio sound over a suitable frequency range. However, since space in the vehicle compartment available for the speakers is seriously limited, the size of cone-type speakers to be installed in the vehicle compartment must be limited. On the other hand, in order to clearly reproduce relatively low-frequency sounds, such speakers must be relatively large. For example, at a frequency of 500 Hz, the speaker diameter must be approximately 20 cm. Such a large diameter speaker cannot be installed in the vehicle compartment without significantly reducing the free space in the vehicle compartment. Particularly, in an audio system having recessed speakers disposed between inner and outer vehicle panels or installed below the rear parcel shelf, the size of the speaker which can be used is strictly limited.

Consequently, for standard passenger cars, speakers with a diameter of 5 to 10 cm are generally used. This degrades the audio sound reproduction quality, particularly with respect to relatively low-frequency sound.

In view of the above, there has been proposed a speaker utilizing a vehicle panel as a sound-producing or amplifying medium. Such a speaker comprises a vehicle panel and a driver unit associated with the vehicle panel, at least a part of which is adapted to oscillate to produce audio sound when driven by the driver unit.

The present invention is generally an improvement of the foregoing prior invention for obtaining better quality and higher amplitude audio sound reproduction.

SUMMARY OF THE INVENTION

Therefore, it is an object of the present invention to provide a speaker for an automotive audio system, which speaker has means for amplifying vibration transmitted from a driver unit to a vehicle panel serving as an audio sound-producing or amplifying medium.

Another and more specific object of the present invention is to provide a speaker which uses a portion of a vehicle panel as the sound-producing medium, the vehicle panel having integral structural features defining a vibrating area which can oscillate with respect to the remainder of the vehicle panel.

An additional object is to provide a vehicle panel speaker with a structurally-defined vibrating area and structural features defining the vibrating area so as to enhance low-frequency vibrations thereof.

According to the present invention, the speaker for the automotive audio system utilizes at least a part of a vehicle panel which constitute a vehicle body independently of the speaker and adapted for oscillation at audio frequency. The vehicle panel serving as a sound-producing medium comprises an inner section to be directly driven by a driver unit of the speaker and an outer section connected to the first section via a relatively flexible intermediate section. The relatively flexible intermediate section is adapted to transmit the audio frequency oscillation. The relatively flexible intermediate section serves for amplifying the magnitude of the audio frequency vibration of the vehicle panel and/or for expanding the audio frequency range to be reproduced. Especially, the relatively flexible intermediate section is adapted to improve the reproduction of a relatively low frequency range of audio sound.

In one embodiment of the present invention, a vehicle panel speaker for an automotive audio system comprises a member having at least a section adapted to oscillate for producing an audio sound, the member forming a part of the vehicle independent from the audio system, means separating the member into a first central portion and a second surrounding portion, the first and second portions being connected to each other via a relatively flexible intermediate section, and a driver unit connected to the audio system and positioned adjacent the first section to cdrive the first and second sections for oscillation at an audio frequency.

In another aspect of the invention, a vehicle panel speaker for an automotive audio system comprises a a vehicle panel per se constituting a part of vehicle body and adapted to oscillate for producing an audio sound, the vehicle panel including a central first section and second section surrounding the first section, means for forming a relatively flexible intermediate section between the first and second sections for transmission of the audio frequency vibration therebetween, and a driver unit secured at approximately the center of the first section and adapted to drive the vehicle panel at the audio frequency in response to an audio signal fed from the automotive audio system.

BRIEF DESCRIPTION OF THE DRAWINGS

The present invention will be understood more fully from the detailed description given hereinbelow and from the accompanying drawings of the preferred embodiments of the invention, which, however, should not be taken as limitative to the invention but for elucidation and explanation only.

In the drawings.

DESCRIPTION OF THE PREFERRED EMBODIMENTS

Figure 1:
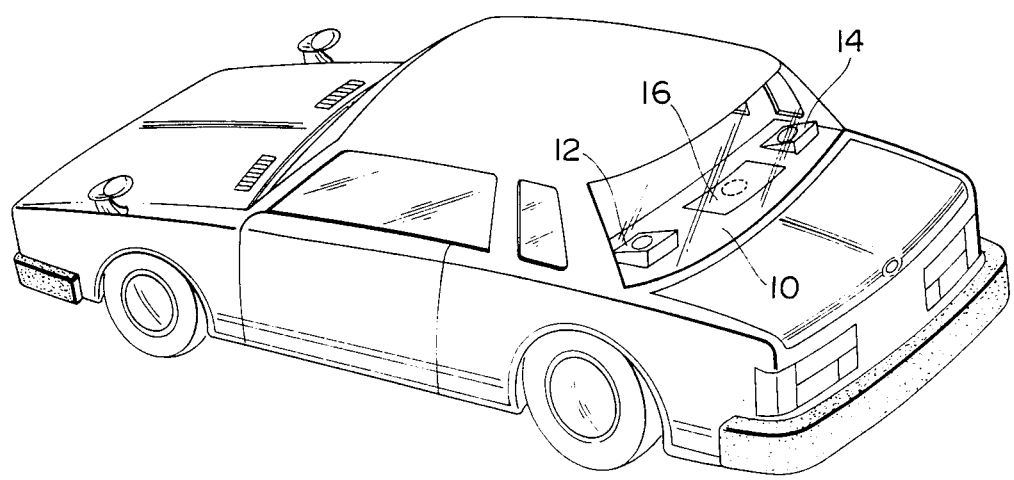
FIG. 1 is a perspective view of an automotive vehicle having a rear parcel shelf on which a vehicle panel speaker according to the present invention is mounted to constitute a speaker system of an automotive audio system in combination with ordinary cone-type speakers.

Referring now to the drawings, particularly to FIG. 1, there is fragmentarily illustrated a speaker system for an automotive audio system. The speaker system has been installed in a rear parcel shelf 10 and comprises a pair of cone-type speakers 12 and 14 which reproduce intermediate and high frequency audio sound, and a speaker 16 according to the present invention for reproducing low frequency audio sound. The speaker 16 cooperates with the cone-type speakers 12 and 14 for full-frequency-range stereo sound reproduction while the automotive audio system is in operation.

It should be appreciated that, while the invention will be described in terms of a specific speaker system arrangement, the arrangement of the speaker system can be modified in many ways and the speaker system can be installed not only on the rear parcel shelf but also at any suitable place in the vehicle.

Figure 2:
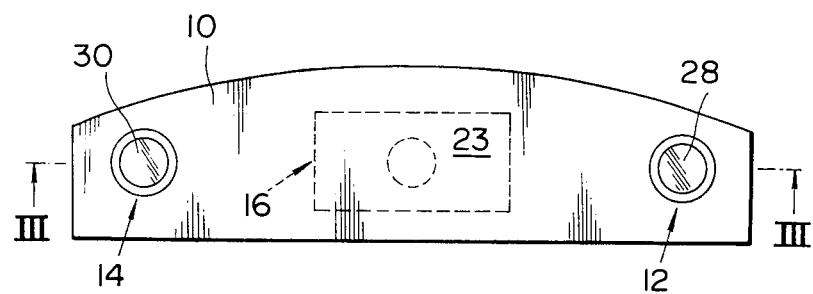
FIG. 2 is a plan view of the rear parcel shelf in the vehicle of FIG. 1.
Figure 3:
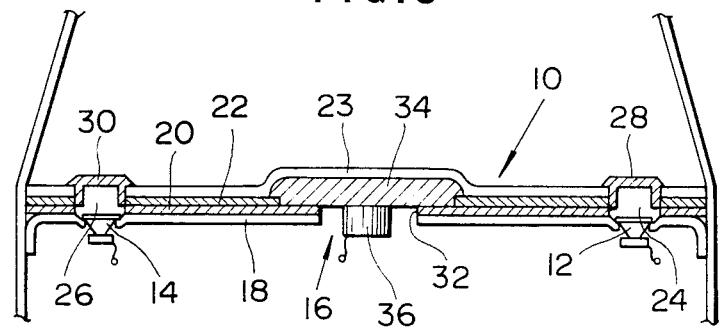
FIG. 3 shows a cross-section of the rear parcel shelf taken along line III—III of FIG. 2.

As shown in FIGS. 2 and 3, the cone-type speakers 12 and 14 are respectively suspended from a rear parcel shelf inner panel 18. In the shown embodiment, a felt sheet 20 and a sheet of carpeting 22 are layered over the rear parcel shelf inner panel 18 to provide vibration insulation and thus avoid mutual interference of reproduced sound from the different speaker 12, 14, 16. The rear parcel shelf inner panel 18, the felt sheet 20, and carpet 22 form the rear parcel shelf 10 with a rear parcel shelf upper panel 23 which serves as an audio sound-producing medium by oscillation thereof.

The rear parcel shelf 10 is formed with through openings 24 and 26 at locations respectively corresponding to the positions of the cone-type speakers 12 and 14. The upper opening ends of the through openings 24 and 26 are covered with decorative cover members 28 and 30. The rear parcel shelf 10 also has a through opening 32 of larger size than the through openings 24 and 26. In the shown embodiment, the through opening 32 is of rectangular shape, but the shape of the through opening 32 is not limited to the specific shape shown. A vibrating panel 34 covers most of the through opening 32 and is supported thereby. A driver unit 36 is secured to the vibrating panel 34 to drive the vibrating panel to oscillate and thereby produce the audio sound vibrations.

Figure 4:
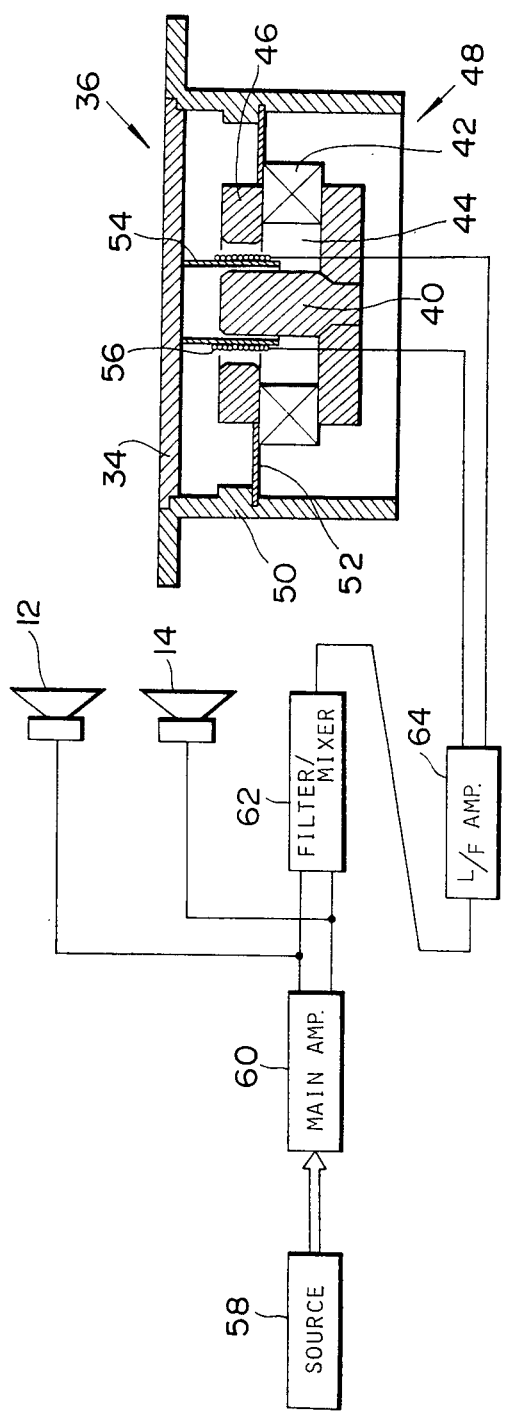
FIG. 4 is a diagram of an automotive audio system including a partial cross-section of a driver unit in the vehicle panel speaker according to the present invention.

As shown in FIG. 4, the driver unit 36 comprises a flat yoke plate (not shown) with a pole piece 40 (partially shown) projecting perpendicularly therefrom, an annular magnet 42 (partially shown) concentrically encircling the pole piece 40 with a clearance 44 therebetween, and an annular yoke plate 46 also surrounding the pole piece with a given clearance. The assembly 48 of the flat yoke plate, the pole piece 40, the magnet 42 and the annular yoke plate 44 is suspended from a housing 50 by means of a resilient damper 52. In the assembly 48, a permanent magnetic field is generated around the pole piece 40, the magnet 42 and the flat yoke plate.

A cylindrical bobbin 54 is secured to the vibrating panel 34 so as to project into the permanent magnetic field. A magnetic coil 56 is wound around the portion of the bobbin 54 in the permanent magnetic field. The magnetic coil 56 is energized by an audio frequency signal from the audio system. The audio system comprises an audio signal source 58 such as a radio tuner, a tape deck and so forth, a main amplifier 60, a mixer/filter circuit 62 and a low-frequency amplifier 64. The main amplifier 60 receives an audio signal from the audio signal source 58 and produces a left-side amplifier output signal and a right-side amplifier output signal for producing a stereo sound. The left-side and right-side amplifier output signals are respectively fed to the cone-type speakers 12 and 14 to drive the latter at intermediate and high frequencies in order to reproduce intermediate and high frequency audio sound.

At the same time, the left-side and right-side amplifier output signals are fed to the mixer/filter circuit 62. In a mixer in the mixer/filter circuit 62, the left-side and right-side amplifier output signals are combined to be modulated into a monaural signal. The low-frequency component of the monaural signal passes through a filter in the mixer/filter circuit 62 and then is amplified by the low-frequency amplifier 64. The amplifier outputs the amplified signal to the magnetic coil 56 to drive the latter at the frequency of the output signal.

Figure 5:
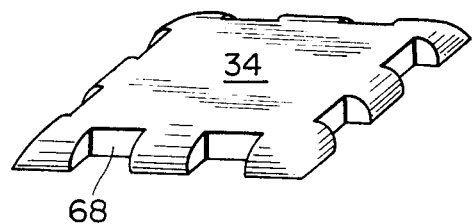
FIG. 5 is a perspective view of a vibrating panel constituting part of the rear parcel shelf of FIG. 2 according to the first embodiment of the present invention.
Figure 6:
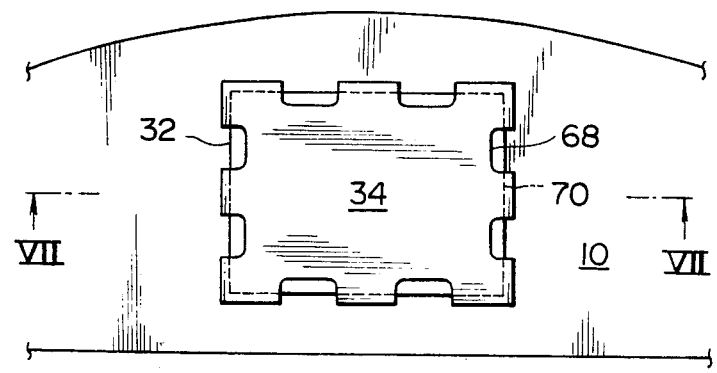
FIG. 6 is a plan view of the vibrating panel of FIG. 5 as mounted on the rear parcel shelf.
Figure 7:
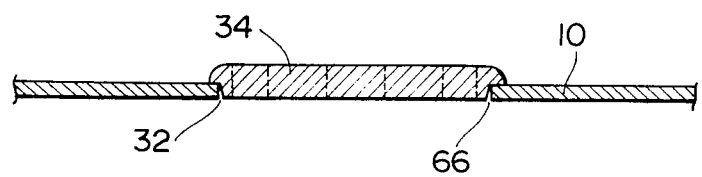
FIG. 7 shows a cross section of the rear parcel shelf taken along line VII—VII of FIG. 6.

FIGS. 5 to 7 show the structure of the vehicle panel which serves as the audio sound-producing medium according to the first embodiment of the present invention. As particularly shown in FIGS. 5 and 6, the vibrating panel 34 has an essentially rectangular shape corresponding to the shape of the through opening 32 in the rear parcel shelf 10. The vibrating panel 34 is slightly larger than the through opening and has a recess 66 along its lower peripheral edge. The recess 66 is adapted to engage the edge of the through opening 32, as shown in FIG. 7.

Along the periphery of the vibrating panel 34, there are formed a plurality of substantially rectangular cut-outs 68 to reduce the contact area between the panel 34 and rear parcel shelf 10. Therefore, the remaining portions 70 of the vibrating panel 34 engage the edge of the through opening 32. The remaining portions 70 of the vibrating panel 34 are fixedly secured to the rear parcel shelf upper panel 23 to transmit vibrations when driven by the driver unit 36.

In this construction, the vibrating energy provided by the driver unit 36 is transmitted through the reduced contacting area. This results in an increase in amplitude of the vibrations and thus of the reproduced audio sound. Thus, the capacity of the speaker becomes larger for better quality of sound.

Figure 8:
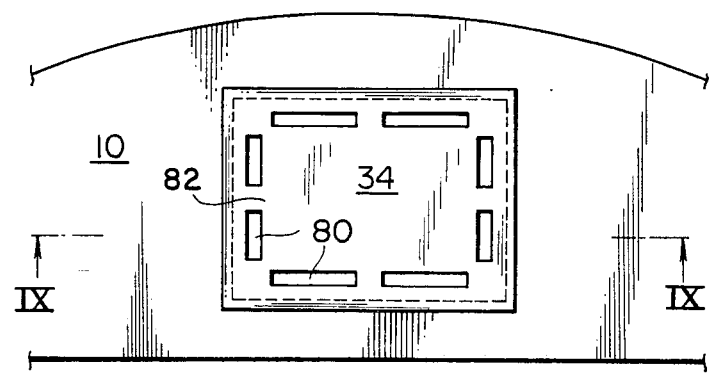
FIG. 8 is a plan view of the second embodiment of the vehicle panel speaker according to the present invention.
Figure 9:
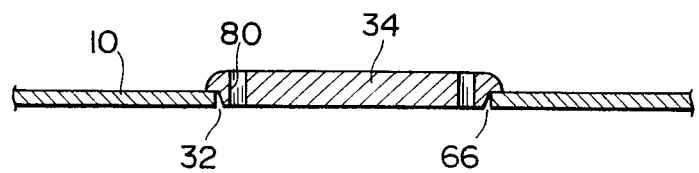
FIG. 9 shows a cross-section taken along line IX—IX of FIG. 8.
Figure 10:
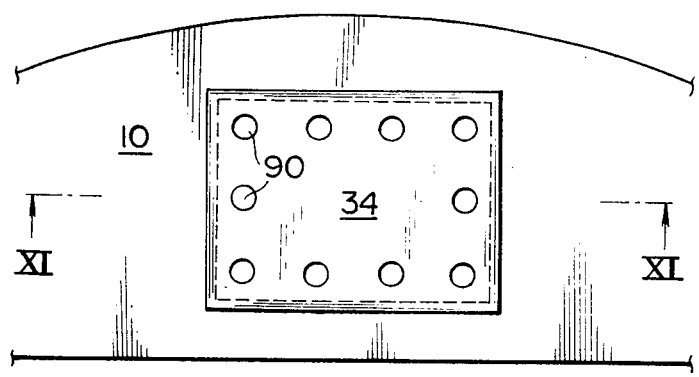
FIG. 10 is a plan view of a modification of the second embodiment of FIGS. 8 to 9.
Figure 11:
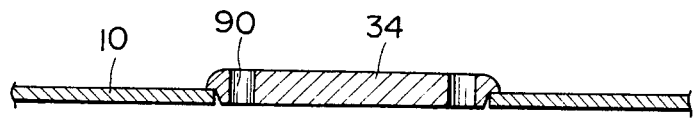
FIG. 11 shows a cross-section taken along line XI—XI of FIG. 10.

FIGS. 8 and 9 show the second embodiment of the vehicle panel structure according to the invention. As in the foregoing first embodiment, the rear parcel shelf 10 is formed with the through opening 32 and the vibrating panel 34 has the peripheral recess 66 which engages the edge of the through opening 32. In this embodiment, the vibrating panel 34 is formed with a plurality of rectangular holes 80 parallel to and near its edge. The portions 82 of the vibrating panel 34 between adjacent rectangular holes 80 transmit vibrations imparted to the central portion of the vibration panel 34 by the driver unit 36 to the periphery portion thereof separated from the central portion by the rectangular holes 80.

As in the foregoing first embodiment, the rectangular holes 80 reduce the area across which vibrations are transmitted in order to increase the amplitude of the vibrations.

FIGS. 10 to 13 illustrate modifications of the foregoing second embodiment of the invention. In one modification shown in FIGS. 10 and 11, a plurality of circular holes 90 are aligned around the vibrating panel 34 parallel to the periphery of the vibrating panel. The array of holes 90 defines a portion for transmitting the vibration energy imparted to the central portion by the driver unit to the peripheral portion outside of the aligned holes. The vibration amplitude-amplying effect achieved by the foregoing second embodiment can also be achieved with this structure.

Figure 12:
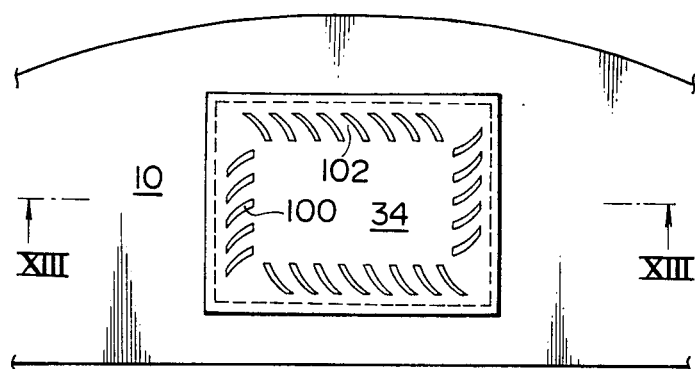
FIG. 12 is a plan view of another modification of the second embodiment of FIGS. 8 and 9.
Figure 13:
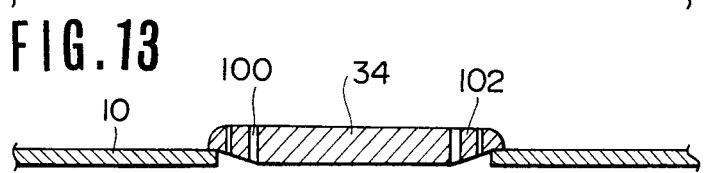
FIG. 13 shows a cross section taken along line XIII—XIII of FIG. 12.

FIGS. 12 and 13 show another modification of the second embodiment of the vibrating panel structure. A plurality of circular arc-shaped slits 100 are formed in the vibrating panel 34 aligned parallel to the edge of the vibrating panel. The portions 102 of the vibrating panel between the adjacent slits 100 serve to amplify vibrations and transmit the amplified vibrations to the circumferential portion of the round vibrating panel.

In addition, according to this modification, since the axes of the slits are oblique to the radii of the vibrating panel, the portions 102 are longer and thus more flexible than they would be otherwise. This allows the central portion of the vibrating panel 34 to vibrate with greater amplitude and less distortion. This helps to suppress resonance of the rear parcel shelf owing to the natural resonance of the rear parcel shelf at its resonating frequency. As a result, a speaker with the panel according to this modification may provide clearer sound with less noise.

Figure 14:
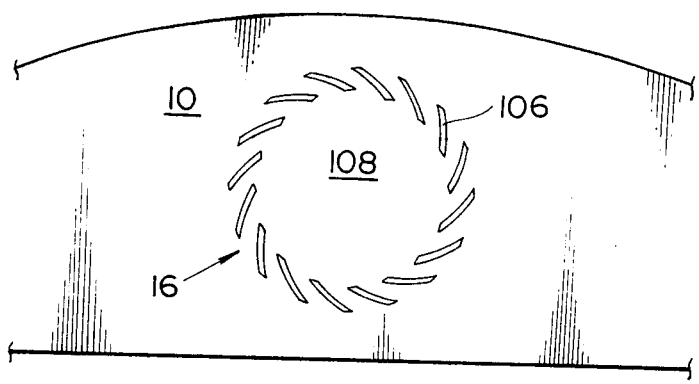
FIG. 14 is a plan view of a modification of the system of FIGS. 12 and 13.

FIG. 14 shows a modification of the embodiment of FIGS. 12 and 13. In this embodiment, the rear parcel shelf 10 is formed with a plurality of circular arc shaped slits 106 around the central portion 108 from which the driver unit 36 is suspended. The central portion 108 is integral with the major part of the rear parcel shelf as opposed to the vibrating panel. The rear parcel shelf 10 is itself made of a material having good acoustical properties.

The circular arc shaped slits 106 are arrayed in a circle and thus define the circular central portion 108. This modification achieves substantially the same vibration-amplifying effect as in the embodiment of FIGS. 12 and 13.

Figure 15:
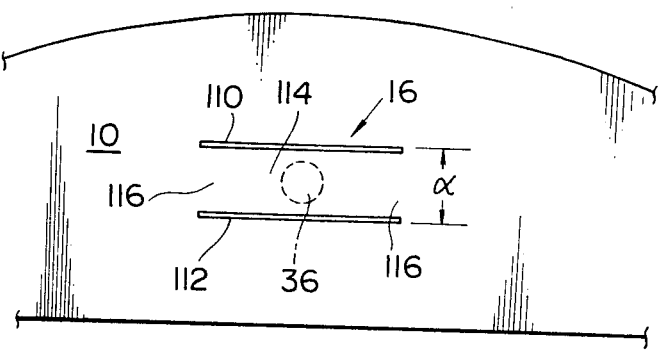
FIG. 15 is a plan view of a further modification of the system of FIGS. 12 and 13.

FIG. 15 is yet another modification of the second embodiment. In this modification, a pair of elongated slots 110 and 112 are formed in the rear parcel shelf. The elongated slots extend parallel to each other and are located in the central portion 114 of the rear parcel shelf on which the driver unit 36 is mounted as illustrated in broken line. In the preferred construction, the distance $a$ between the slots 110 and 112 is approximately 400 mm. The central portion 114 is suspended between the portions 116 between opposing ends of the elongated slots 110 and 112 to allow the central portion to oscillate in response to the driving power generated by the driver unit 36.

As a result, the speaker using the rear parcel shelf constructed as set forth can produce relatively low-frequency audio sound at an enhanced amplitude level.

Figure 16:
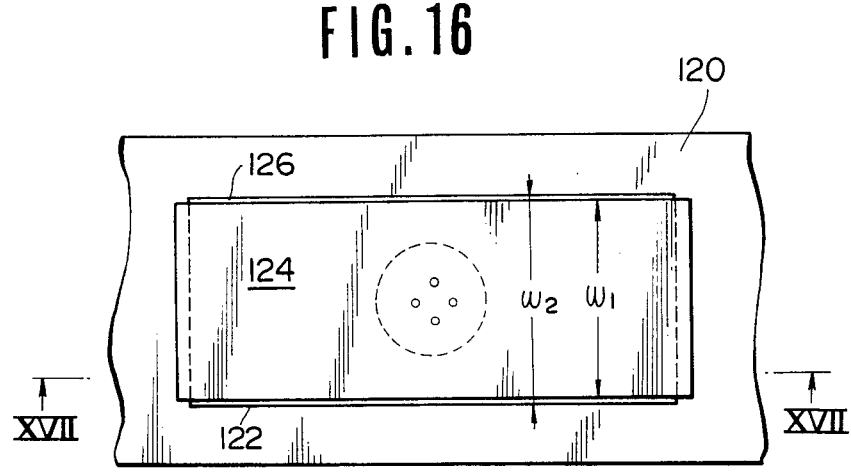
FIG. 16 is a plan view of the third embodiment of the vehicle panel speaker according to the present invention.
Figure 17:
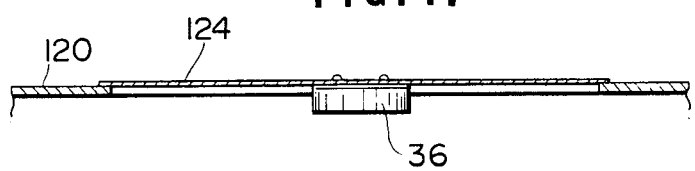
FIG. 17 shows a cross-section taken along line XVII—XVII of FIG. 16.

FIGS. 16 and 17 show a third embodiment of the vehicle panel to be utilized as a speaker in the automotive audio system, which vehicle panel serves as the sound-producing medium. The vehicle panel 120 is formed with a substantially rectangular opening 122. The area of the rectangular opening 122 is determined in accordance with the audio frequency range to be reproduced. By way of example, the size of the opening may be chosen to be approximately 130 mm × 400 mm for use at relatively low frequencies.

Figure 18:
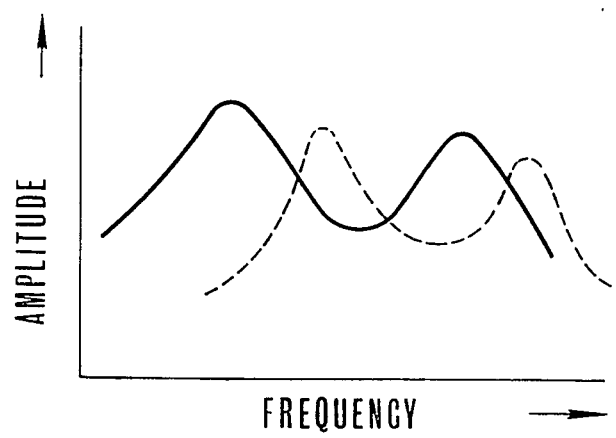
FIG. 18 is a graph of the variation of the audio sound level, i.e., vibration amplitude of the vehicle panel, in relation to the audio sound frequency to be produced.

A vibrating panel 124 is made of a material different from that of the vehicle panel 120 and having better acoustical properties. For example, the vibrating panel 124 may be made of urethane foam or the like with a thickness of several mm. The vibrating panel 124 is secured to the vehicle panel 120 at the longitudinal ends of the rectangular opening. The width $w_1$ of the vibrating panel 124 is smaller than that $w_2$ of the rectangular opening 122 so that relatively narrow slots 126 are left along the longitudinal edges of the rectangular opening 122. Due to the narrow clearances 126 along the longitudinal edges thereof, the vibrating panel 124 is free to oscillate in response to driving power provided by the driver unit 36 secured to the central portion of the vibrating panel, as shown in FIGS. 16 and 17. The size and the material of the vibrating panel 124 and the size of the rectangular opening 122 are so chosen that the lower limit of the resonating frequency $f_0$ of the vibrating panel is approximately 50 Hz and that the speaker has frequency-reproduction characteristics as represented by the solid line in FIG. 18. In FIG. 18, the broken line shows the characteristics of frequency reproduction in the prior art. It is apparent from FIG. 18 that the frequency response of the speaker according to this third embodiment is shifted toward lower frequencies with respect to the prior art.

The lower limit resonating frequency $f_0$ of the speaker can be determined from the following equations, in terms of:

- $m_1$ is the mass of the vibrating members including the vibrating panel 124;
- $k_1$ is the spring modulus of the vibrating members;
- $m_2$ is the mass of the assembly 48 of the flat yoke plate, the pole piece 40, the magnet 42 and the annular yoke plate 44 of FIG. 4;
- $k_2$ is the spring modulus of the driver unit 36 and a resilient damper 52; and
- $\omega = 2\pi f$, where f is the vibration frequency.

Assuming that a vibrating force $F \cos \omega t$ is applied to the mass $m_1$ of the vibrating members and the mass $m_2$ of the assembly, the motion of the mass $m_1$ can be represented by the following equations of motion:

$$m_1 d^2 X_1/dt + k_1 \times 1 + k^2(X_1 - X_2) = -F \cos \omega t \qquad (1)$$

$$m_2 d^2 X_2/dt + k_2(X_2 - X_1) 32 F \cos 107 t \qquad (2)$$

Here, further assume that the forced oscillation at this time are $X_1 = a_1 \cos \omega t$ and $X_2 = a_2 \cos \omega t$; where $a_1$ and $a_2$ are vibration amplitudes. The vibration amplitudes $a_1$ (and $a_2$) can be determined from the following:

$$a_1 = Fm_2\omega^2/[(-m_1 \cdot \omega + k_1 + k_2)(-m_2 \cdot \omega + k_2) - k_2] \qquad (3)$$

The lower limit resonating frequency $f_0$ is obtained when the oscillation magnitude $a_1$ is maximized, that is, when the denominator of the equation (3) approaches zero as below:

$$(-m_1 \cdot \omega^2 + k_1 + k_2)(-m_2 \cdot \omega + k_2) - k_2^2 = 0 \qquad (4)$$

Two values of $\omega$ satisfying the equation are obtained from the foregoing equation (4). From the two values obtained by resolving the equation, the higher value corresponds to the lower limit of the resonating frequency of the speaker. Therefore, the lower limit resonating frequency $f_0$ can be determined to be:

$$f_0 = \frac{1}{2\pi} \sqrt{\frac{m_2(k_2 + k_2) + m_1 k_2 + \sqrt{(m_2(k_1 + k_2) + m_1 k_2)^2 - 4m_1 m_2 k_1 k_2}}{2 m_1 m_2}} \qquad (5)$$

Here, the spring modulus $k_1$ of the vibrating members varies in accordance with the length L of the vibrating plate 124. The spring modulus $k_1$ can be calculated from the following equation:

$$k_1 = L^3/(192 EI) \qquad (6)$$

where E is the Young's modulus of the vibrating panel 124 and I is the cross-sectional area thereof (i.e. $\omega_1$ times the thickness thereof).

As apparent from the above, the spring modulus $k_1$ can be determined in dependence upon the size of the vibrating plate 124. The lower limit of the resonating frequency $f_0$ is, in turn, determined according to the spring modulus $k_1$ of the vibrating members and the material of the vibrating panel 124. Therefore, by suitably selecting the size and the material of the vibrating panel, a desired lower limit resonating frequency can be obtained.

Figure 19:
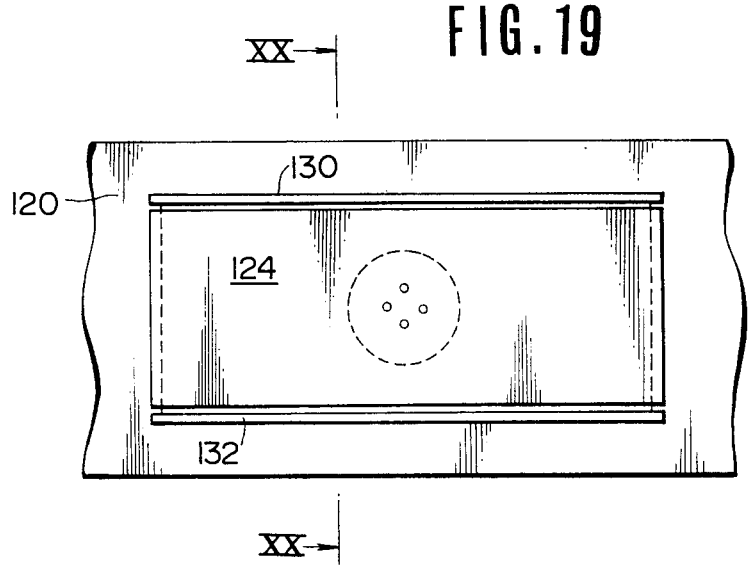
FIG. 19 is a plan view of a modification of the foregoing third embodiment of the vehicle panel construction of FIGS. 16 and 17.
Figure 20:
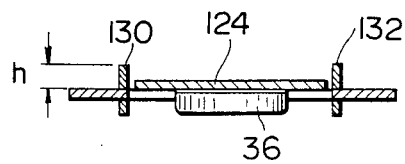
FIG. 20 shows a cross-section taken along line XX—XX of FIG. 19.

FIGS. 19 and 20 show a modification of the third embodiment of the invention. In this modification, a pair of acoustic shields 130 and 132 are provided along the longitudinal edges of the rectangular opening 122. The acoustic shields 130 and 132 have a height h slightly higher than the maximum amplitude of vibration of the vibrating panel 124. Further, the acoustic shields 130 and 132 extend below the vibrating panel 124 at the height h.

Figure 21:
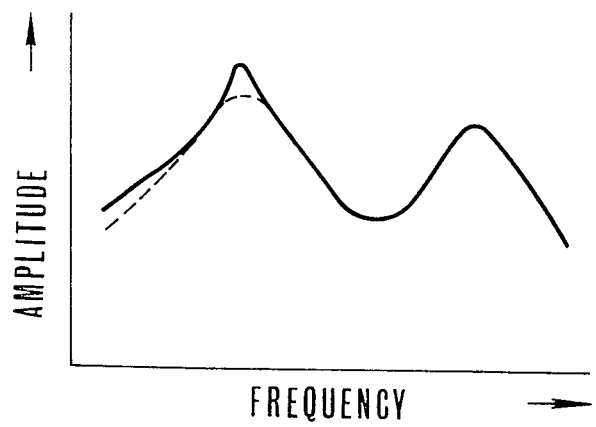
FIG. 21 is a graph similar to FIG. 18 showing the audio sound amplitude variation with respect to the frequency of the audio sound.

By providing the acoustic shields 130 and 132, oscillating air flow across both edges of the vibrating panel 124 is restricted to reduce mutual interference of the audio vibrations in the low frequency range. As a result of this modification, the audio sound level in the low frequency range is increased as shown by the solid line in FIG. 21.

Figure 22:
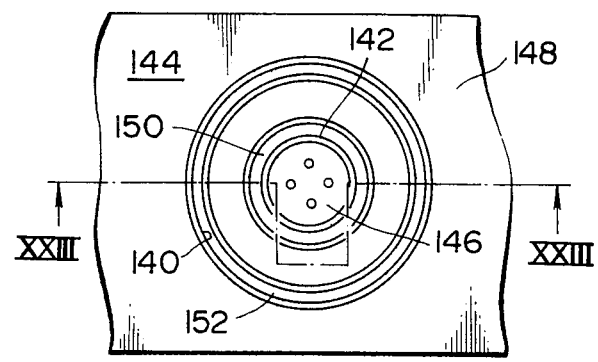
FIG. 22 is a plan view of the fourth embodiment of the vehicle panel speaker according to the present invention.
Figure 23:
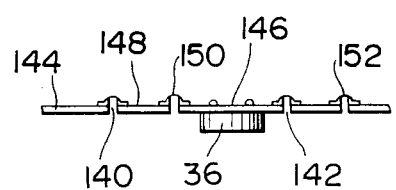
FIG. 23 shows a cross-section taken along line XXIII—XXIII of FIG. 22.

FIGS. 22 and 23 illustrate the fourth embodiment of the vehicle panel structure applicable to as a speaker according to the present invention. In this embodiment, concentric circular slots 140 and 142 are formed in the vehicle panel 144 defining a substantially circular central portion 146 and an annular portion 148. The central portion 146 is connected to the annular portion 148 by a flexible sheet 150. Similarly, the annular portion 148 is connected to the remaining portion of the vehicle panel by a substantially flexible sheet 152.

In the shown embodiment, the vehicle panel 144 is made of a substantially rigid material and the central portion 146 and the annular portion 148 are made of a material suitable for producing audio sound, such as acrylic resin foam plate. The annular portion 148 serves as a primary vibrating panel and the central portion 146 serves as an auxiliary vibrating panel. The annular portion 148 acting as the primary vibrating panel is adapted to produce relative low frequency audio sound and the central portion 146 acting as the auxiliary vibrating panel is adapted to produce relatively high frequency audio sound. The upper limit frequency $f_b$ which can be produced by the primary vibrating panel is regarded as the crossover frequency. In the frequency range between the lower limit resonating frequency $f_0$ and the upper limit frequency $f_b$ of the primary vibrating panel, both of the primary and auxiliary vibrating panels oscillate to produce audio sound, whereas, in the frequency range higher than the upper limit frequency, only the auxiliary vibrating panel oscillates to produce relatively high frequency audio sound. Thus, according to the shown embodiment, a mechanical 2-way speaker with the cross-over frequency at the upper limit frequency of the primary vibrating panel can be obtained.

It should be noted that the upper limit frequency $f_b$ can be determined in dependance on the mass of the primary and auxiliary vibrating panels and the spring moduli thereof. The upper limit frequency $f_b$ of the primary vibrating panel can be obtained from the following equation:

$$f_b = \frac{1}{2\pi}\left(\frac{1}{m_b} + \frac{1}{m_a}\right) k_3$$

where $m_b$ is the equivalent mass of the primary vibrating panel;

$m_a$ is the equivalent mass of the auxiliary vibrating panel; and $k_3$ is the spring modulus at the circumferential edge of the auxiliary vibrating panel.

Figure 24:
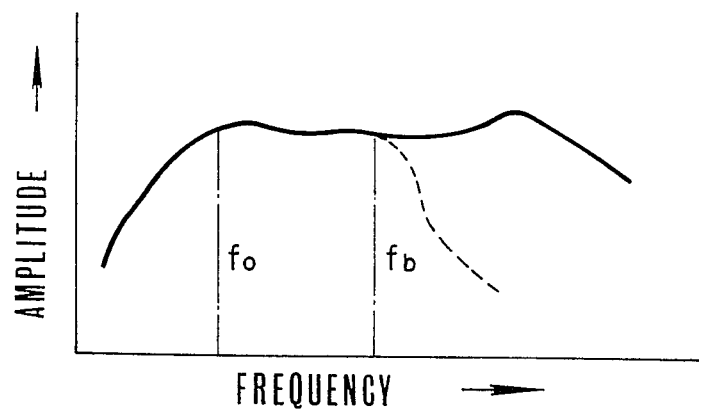
FIG. 24 is a graph of the audio sound amplitude variation of the vehicle panel speaker of FIGS. 22 and 23, with respect to the audio sound frequency.

The frequency characteristics of the speaker according to the foregoing fourth embodiment are illustrated in FIG. 24. As apparent from FIG. 24, the variation of the audio sound level with frequency is more linear with fewer peaks and dips across a broader frequency range than in the prior art represented by the broken line trace in FIG. 24.

Figure 25:
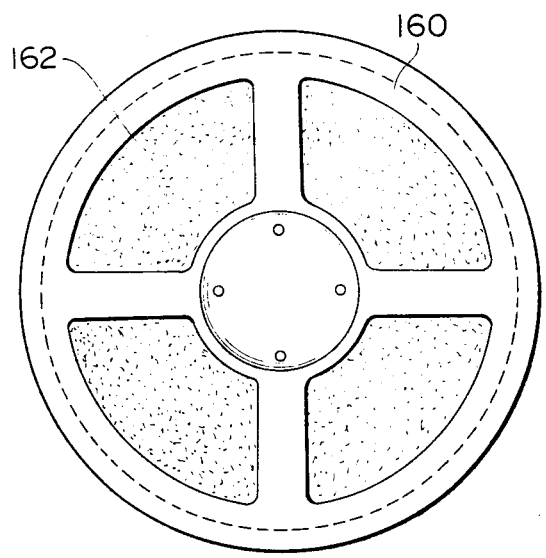
FIG. 25 is an enlarged plan view of an auxiliary vibrating panel in the foregoing fourth embodiment, showing a modification of the fourth embodiment.

FIG. 25 shows a modification of the auxiliary vibrating panel of the foregoing fourth embodiment. For added clarity, in FIG. 25, the auxiliary vibrating panel is illustrated upside down. The auxiliary panel of this modification comprises a frame member 160 made of a suitable material, such as fiber reinforced plastic (FRP) and a cloth 162 glued to the frame member. The cloth 162 is chosen to be permeable to air.

When the auxiliary vibrating panel as constructed above is driven at relatively low frequencies below the upper limit frequency of the primary vibrating panel, the primary vibrating panel drives the air at the given frequency to create audio sound. On the other hand, at higher frequencies above the upper limit frequency, since the auxiliary vibrating panel can never drive the air due to its permeability, no sound is produced. As a result, audio sound at frequencies above the upper limit frequency can be filtered out. Thus, a speaker having the auxiliary vibrating panel of FIG. 25 will function as a speaker with a mechanical low-pass filter.

Figure 26:
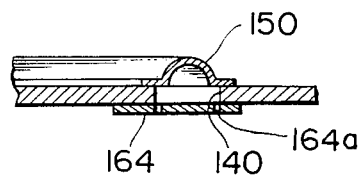
FIG. 26 is an enlarged cross-section view of another modification of the fourth embodiment of the vehicle panel speaker.
Figure 27:
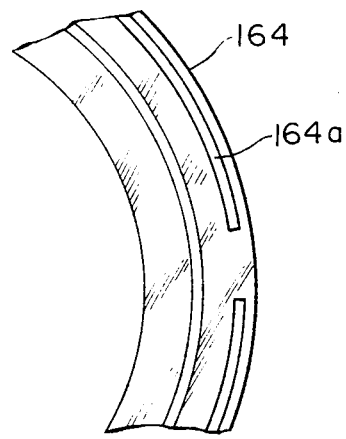
FIG. 27 is a plan view of the vehicle panel of FIG. 26.

FIGS. 26 and 27 show another modification of the foregoing fourth embodiment. A reinforcing member 164, such as a thin stainless steel plate or the like bridges the slot 140 on the side of the vehicle panel opposite the side on which the flexible sheet 150 is attached. This extends the lifetime of the speaker and ensures production of the desired frequency range of audio sound. Slits 164a are formed in the reinforcing member 164 for providing flexibility therefor to allow the reinforcing member at the audio frequency.

Figure 28:
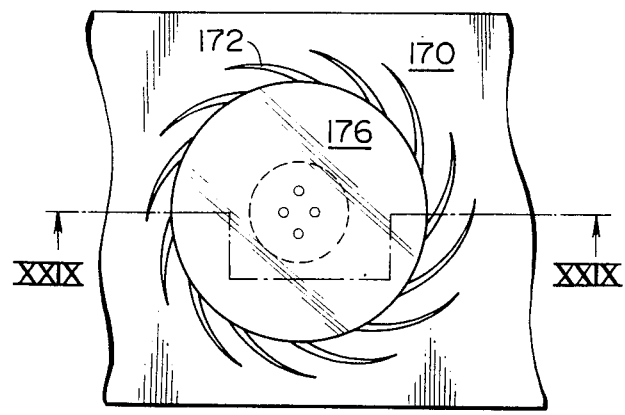
FIG. 28 is a plan view of the fifth embodiment of the vehicle panel speaker according to the present invention.
Figure 29:
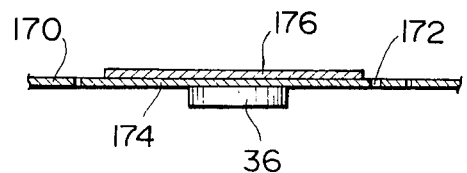
FIG. 29 shows a cross-section taken along line XXIX—XXIX of FIG. 28.

FIGS. 28 and 29 show the fifth embodiment of the vehicle panel to be applied to the speaker according to the present invention. The vehicle panel 170 is formed with a plurality of circular arc-shaped slits 172 arrayed about the circumference of a circular central portion 174. As in the foregoing embodiment of FIG. 14, the slits 172 serve to amplify the oscillation of the central portion 174 to produce greater sound pressure. According to the shown embodiment, a circular vibrating plate 176 is fitted onto the circular central portion 174 of the vehicle panel. The circular vibrating plate 176 has a diameter substantially corresponding to that of the circular central portion and is made from laminated wood, for example, "Dairark" (trade name), or from metal such as aluminum, or the like. The driver unit 36 is secured to the circular central portion 174 to drive the vehicle panel to produce the audio sound.

As set forth with respect to the third embodiment of FIGS. 16 and 17, the lower limit resonating frequency of the vehicle panel is determined dependent upon the mass of the vibrating member, i.e. the mass of the vehicle panel, and the spring modulus thereof as specified from the equation:

$$f_0 = \frac{1}{2\pi}\sqrt{\frac{m_2(k_2 + k_2) + m_1 k_2 + \sqrt{(m_2(k_1 + k_2) + m_1 k_2)^2 - 4m_1 m_2 k_1 k_2}}{2m_1 m_2}}$$

Figure 30:
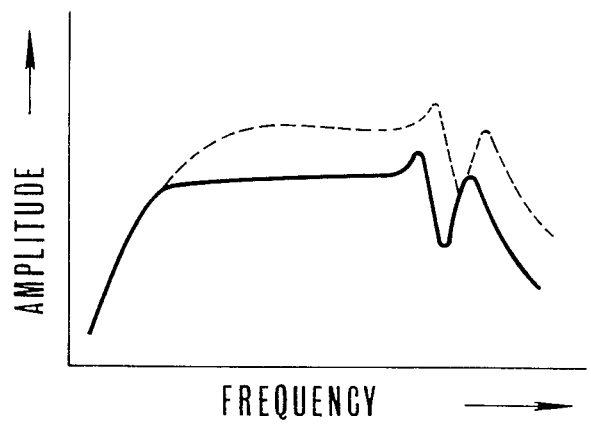
FIG. 30 is a graph of the audio sound amplitude variation in the vehicle panel speaker of FIG. 29, with respect to the audio sound frequency.

As apparent from the foregoing equation, by attaching the vibrating plate on to the vehicle panel at the portion where the vibration energy is provided by the driving unit, the audio sound frequency range to be produced can be lowered, as illustrated in solid line in FIG. 30.

While the specific embodiments can be disclosed hereabove for describing the present invention in detail, the invention should not be understood to be limited to the specific embodiments but to include all the possible modifications. For example, the speaker system set forth above can be applied not only for the vehicle rear parcel shelf but also any other suitable place such as vehicle side doors, instrument panel and so forth. Furthermore, the driver unit can be modified in many ways.

What is claimed is:

1. A vehicle panel speaker for an automotive audio system comprising:

a vehicle panel constituting a part of a vehicle body and adapted to oscillate at an audio frequency for producing an audio sound, said vehicle panel including a central first section and a second section surrounding said first section;

an intermediate section interpositioned between said first and second section for transmission of the audio frequency vibration therebetween, said intermediate section being relatively flexible in comparison with said first and second sections so as to allow said first section to oscillate at low frequency range of the audio frequency in an amplitude sufficient for reproducing audio sound; and a driver unit secured at approximately the center of said first section and adapted to drive said vehicle panel at the audio frequency in response to an audio signal fed from the automotive audio system, said driver unit including a housing secured to said vehicle panel and a driver assembly received in said housing and resiliently suspended therein, said driver assembly associated with a voice coil wrapped around a bobbin extending from said vehicle panel for causing vibration of said vehicle panel in accordance with said audio signal.

2. The vehicle panel speaker as set forth in claim 1, wherein said intermediate section comprises means to amplify the magnitude of audio frequency oscillation of said vehicle panel.

3. The vehicle panel speaker as set forth in claim 1, wherein said intermediate section is adapted to provide a substantially wide frequency range to be reproduced as audio sound.

4. The vehicle panel speaker as set forth in claim 3, wherein said intermediate section is adapted to enhance the low frequency range of audio sound.

5. The vehicle panel speaker as set forth in claim 3, wherein said intermediate section is adapted to allow transmission of the audio frequency vibration to oscillate both of said first and second sections at an intermediate and a high frequency range and to oscillate said second section at the low frequency range.

6. The vehicle panel speaker as set forth in claim 2, wherein at least one opening is defined through the vehicle panel between said first and second sections, and leaving said intermediate section bridging between said first and second sections.

7. The vehicle panel speaker as set forth in claim 6, wherein a plurality of said openings are formed in alignment along the perimeter of said first section.

8. The vehicle panel speaker as set forth in claim 4, wherein said panel defines a pair of slots extending in a parallel relationship with respect to each other for defining said first section therebetween.

9. The vehicle panel speaker as set forth in claim 8, wherein a sound shield member is disposed within each of said slots for restricting transmission of sound pressure via ambient air between both sides of said vehicle panel so as to avoid interference of sound pressure.

10. The vehicle panel speaker as set forth in claim 5, wherein said first and second sections define a slot extending to entirely surround said first section, and said intermediate section comprises a flexible sheet secured to first and second sections for bridging therebetween.

11. The vehicle panel speaker as set forth in claim 10, wherein said first section comprises a frame and a cloth stretched on said frame and said first section serves as high-out filter.

12. The vehicle panel speaker as set forth in claim 4, wherein said vehicle panel is fitted with a vibration plate at said first section, said vibration plate extending over said first section to increase mass of said first section for lowering the audio sound frequency range to be produced.

13. A woofer system for an automotive audio system, comprising:
an audio unit for producing an audio signal;
a driver unit responsive to said audio signal to cause oscillation of a vehicle panel at a low frequency range of audio frequency; and
said vehicle panel being a vehicle component forming a part of a vehicle and having separated first and second sections, said first section being directly associated with said driver unit to be driven therewith and said second section surrounding said first section, and said first and second sections being connected to each other through an intermediate section for transmitting audio frequency-vibration of said first section to said second section therethrough, said intermediate section being flexible enough to allow said first section to oscillate relative to said second section at an amplitude sufficient for reproducing audio sound,
wherein said driver unit comprises a driver housing secured to said panel, a driver assembly resiliently suspended within said driver housing, and a voice coil wrapped around a bobbin rigidly secured to said first section of said vehicle panel and connected to said audio unit for receiving therefrom the audio signal for movement relative to said driver assembly according to energization and deenergization thereof depending upon the audio signal, to drive said first section.

14. The woofer system as set forth in claim 13, wherein said vehicle panel is a rear parcel shelf of the vehicle.

15. The woofer system as set forth in claim 13, wherein said intermediate section defines at least one opening adjacent a peripheral edge of said first section for flexibility of said intermediate section.

16. The woofer system as set forth in claim 15, wherein a plurality of openings are formed in the intermediate section along the periphery of said first section.

17. The woofer system as set forth in claim 15, in which a continuous opening extends around the periphery of said first section for separating said first section from said second section, and a flexible sheet member forms said intermediate section and bridges said first and second sections.

18. The woofer system as set forth in claim 17, wherein said first section is adapted to oscillate at a relatively high frequency range of audio frequency and said second section is adapted to oscillate at a low frequency range of audio frequency, and oscillation ranges of said first and second sections overlap each other to form a mechanical two-way speaker.

19. The woofer system as set forth in claim 17, wherein said sheet member is not permeable to prevent absorption of acoustic oscillation created by said first and second sections.

20. The woofer system as set forth in claim 17, wherein said first section comprises a frame member and a permeable sheet member stretched on said frame, said permeable sheet member absorbing high frequency range of acoustic vibration.

21. The woofer system as set forth in claim 15, wherein said first section of the vehicle panel has a rectangularly-shaped configuration and said opening comprises a pair of slits extending along opposite longitudinal side edges of said first section, whereby said first section is connected to said second section at both of shorter side edges of said first section.

22. The woofer system as set forth in claim 21, which further comprises a sound insulator provided along each of said slits.

* * * * *

UNITED STATES PATENT AND TRADEMARK OFFICE
CERTIFICATE OF CORRECTION

PATENT NO. : 4,551,849

DATED : November 5, 1985

INVENTOR(S) : Junichi Kasai et al

It is certified that error appears in the above-identified patent and that said Letters Patent is hereby corrected as shown below:

Title page:

Change assignee from solely "Nissan Motor Company, Limited" to

--Nissan Motor Company, Limited and Clarion Co., Ltd.--.

Signed and Sealed this

Third Day of June 1986

[SEAL]

*Attest:*

DONALD J. QUIGG

*Attesting Officer*    *Commissioner of Patents and Trademarks*